(12) United States Patent
Braun et al.

(10) Patent No.: US 11,913,774 B2
(45) Date of Patent: Feb. 27, 2024

(54) VISUAL CRIMP MONITORING

(71) Applicant: HARTING ELECTRIC GMBH & CO. KG, Espelkamp (DE)

(72) Inventors: Marco Braun, Espelkamp (DE); Felix Loske, Espelkamp (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 291 days.

(21) Appl. No.: 17/598,087

(22) PCT Filed: Mar. 16, 2020

(86) PCT No.: PCT/DE2020/100202
§ 371 (c)(1),
(2) Date: Sep. 24, 2021

(87) PCT Pub. No.: WO2020/192837
PCT Pub. Date: Oct. 1, 2020

(65) Prior Publication Data
US 2022/0187058 A1 Jun. 16, 2022

(30) Foreign Application Priority Data

Mar. 26, 2019 (DE) ..................... 10 2019 107 687.0

(51) Int. Cl.
*H01R 43/05* (2006.01)
*H01R 43/055* (2006.01)
(Continued)

(52) U.S. Cl.
CPC ............ *G01B 11/12* (2013.01); *B23P 11/005* (2013.01); *B23P 19/105* (2013.01);
(Continued)

(58) Field of Classification Search
CPC ..... B23P 11/005; B23P 19/008; B23P 19/105; Y10T 29/49769; Y10T 29/49771;
(Continued)

(56) References Cited

U.S. PATENT DOCUMENTS 3,839,776 A * 10/1974 Anderson ............. H01R 43/05
29/862
4,854,031 A * 8/1989 Eisenzimmer ....... B21D 39/048
72/402
(Continued)

FOREIGN PATENT DOCUMENTS

CN        201741828 U    2/2011
DE   10 2013 203 553 B3   7/2014
(Continued)

OTHER PUBLICATIONS

German Patent Office, Office Action for German application No. 10 2019 107 687.0 dated Jul. 23, 2020, 8 pages.

*Primary Examiner* — Jermie E Cozart
(74) *Attorney, Agent, or Firm* — Seed IP Law Group LLP

(57) ABSTRACT

A method is provided for ensuring and/or checking the quality of a crimping using a crimping machine for crimping a cable with a contact sleeve and using a first optical sensor for detecting and/or recording first image data of the contact sleeve and using an evaluation electronics system. The method includes detecting the first image data of the contact sleeve by the first optical sensor; carrying out, via the evaluation electronics system, a first comparison of the first image data of the first optical sensor with first reference data of a predetermined contact sleeve; checking the first comparison for the presence of a predetermined first criterion; and, if the predetermined first criterion is satisfied, outputting a first signal. The detection of the first image data and the first comparison and the checking for the first criterion and the output of the first signal are carried out before the (Continued)

cable is crimped with the contact sleeve. A crimping machine suitable for carrying out the above method is also provided.

14 Claims, 6 Drawing Sheets

(51) Int. Cl.
*B23P 11/00* (2006.01)
*B23P 19/10* (2006.01)
*G01B 11/12* (2006.01)
*H01R 43/048* (2006.01)
*B23P 19/00* (2006.01)

(52) U.S. Cl.
CPC ......... *H01R 43/0488* (2013.01); *H01R 43/05* (2013.01); *H01R 43/055* (2013.01); *B23P 19/008* (2013.01); *H01R 2201/20* (2013.01); *Y10T 29/4978* (2015.01); *Y10T 29/49769* (2015.01); *Y10T 29/49771* (2015.01); *Y10T 29/49927* (2015.01); *Y10T 29/53065* (2015.01); *Y10T 29/53387* (2015.01); *Y10T 29/53987* (2015.01)

(58) Field of Classification Search
CPC ........... Y10T 29/4978; Y10T 29/49927; Y10T 29/53065; Y10T 29/53387; Y10T 29/53987; H01R 43/0488; H01R 43/05; H01R 43/055
See application file for complete search history.

(56) References Cited

U.S. PATENT DOCUMENTS

| | | | | |
|---|---|---|---|---|
| 5,799,383 | A * | 9/1998 | Baldwin | B25B 27/10 |
| | | | | 29/516 |
| 9,216,449 | B2 * | 12/2015 | Gatz | B21D 39/046 |
| 9,548,581 | B2 * | 1/2017 | Nicholas | H01R 43/058 |
| 2012/0047724 | A1 | 3/2012 | Yano et al. | |
| 2012/0137486 | A1 * | 6/2012 | Charlton | H01R 43/0486 |
| | | | | 29/407.01 |
| 2013/0160284 | A1 * | 6/2013 | Gatz | B21D 39/048 |
| | | | | 29/715 |
| 2014/0041200 | A1 | 2/2014 | Hofmeister | |
| 2014/0283361 | A1 * | 9/2014 | Van Essen | B21D 39/048 |
| | | | | 29/516 |
| 2014/0331495 | A1 | 11/2014 | Nicholas et al. | |
| 2015/0033526 | A1 * | 2/2015 | Morris | H01R 43/055 |
| | | | | 29/33 M |
| 2015/0340827 | A1 * | 11/2015 | Hallman | H01R 43/048 |
| | | | | 29/863 |
| 2016/0016222 | A1 | 1/2016 | Bungter et al. | |

FOREIGN PATENT DOCUMENTS

| | | |
|---|---|---|
| DE | 10 2014 006 604 A1 | 11/2014 |
| DE | 10 2017 102 618 A1 | 6/2018 |
| JP | 2005-216717 A | 8/2005 |
| JP | 2006-241745 A | 9/2006 |
| JP | 2008-177031 A | 7/2008 |
| WO | 2012/110310 A1 | 8/2012 |
| WO | 2017/138115 A1 | 8/2017 |

* cited by examiner

VISUAL CRIMP MONITORING

BACKGROUND

Technical Field

The disclosure relates to a method for visual crimp monitoring and to a crimping apparatus suitable for carrying out the method. In particular the disclosure relates here to a method for ensuring and/or checking the quality of a crimp and a device suitable for carrying out the method.

In crimping, two components are bonded together through plastic deformation under the application of a compression force by a forming tool. A crimp, which means a mechanical bond that is difficult to release between a conductor and a connecting element such as, for example, a plug or a sleeve, is achieved here.

For a lasting, mechanically and electrically stable bond between the crimped components, a high quality of the crimping is desirable when fabricating the crimp. Crimping of inadequate quality can in particular be caused by a faulty crimp blank as well as by an operating failure at a crimping apparatus such as, for example, an incorrectly set crimping height.

Conventionally, quality assurance of a crimped connection is usually done by measuring the crimping depth, through an optical assessment of a micrograph, and/or by force/displacement monitoring during the crimping.

Description of the Related Art

WO 2012/110310 A1 proposes force/displacement monitoring during the crimping as mentioned above. A crimping blank is deformed here plastically by a forming tool. In particular, as the forming tool retracts, both the force that the forming tool exercises on the crimping blank as well as the displacement through which the forming tool moves, is measured by means of a sensor system. A difference in displacement between a position with maximum force and a position that is, for the first time, free of force is used as an indicator for an elastic recovery of the crimping blank. It is proposed that this indicator is used as a measure for the quality of the fabricated crimp.

The method proposed by WO 2012/110310 A1 is not suitable for ascertaining a possible cause for a crimp of undesirable quality.

BRIEF SUMMARY

Embodiments of the invention provide a reliable and economical method for ensuring and/or checking the quality of a crimp and a device suitable for carrying out the method. In particular, here, a method is provided for ensuring and/or checking the quality of an indent crimping of, in particular, a turned contact sleeve and a cable, and in particular of a four-mandrel crimping.

According to a first embodiment of the invention, a method is provided for ensuring and/or checking the quality of a crimp making use of a crimping machine for crimping a cable with a contact sleeve, wherein a first optical sensor for acquiring and/or recording first image data of the contact sleeve is advantageously used, and wherein evaluation electronics, which can be connected for signaling and/or data transfer to an electronic controller, suitable for evaluating the first image data, are used. The electronic controller can appropriately be a programmable logic controller (PLC).

A camera can appropriately be used as the first optical sensor. Cameras can be obtained economically, are easy to configure and to install, and are also available, advantageously miniaturized, with a desirable quality. The camera can, for example, be a CCD camera.

The cable provided for crimping to the contact sleeve can, in particular, be a single-core cable with an insulation and a stranded wire comprising a large number of individual wires. The contact sleeve can, in particular, be a turned contact sleeve.

In one step of the method, the first image data of the contact sleeve are acquired by the first optical sensor, whereupon the evaluation electronics, in a further step, carry out a first comparison of the first image data of the first optical sensor with first reference data of a predetermined contact sleeve. It is clear that the first optical sensor is connected to the evaluation electronics for signaling and/or data exchange.

Image and/or video data can be processed particularly promptly and reliably in a suitable, software-supported subsequent processing and/or evaluation, which may also take artificial intelligence and similar image-evaluating methods into consideration. Software routines suitable for this purpose can be provided in the evaluation electronics.

In a further step, the first comparison is checked for the presence of a predetermined first criterion, after which, in a further step, a first signal is output if the predetermined first criterion is satisfied.

The first reference data mentioned above can, in particular, be image data and/or dimensions of the predetermined contact sleeve that are available to the evaluation electronics.

The predetermined first criterion can, in particular, be a predetermined deviation of the first image data acquired by the first optical sensor from the first reference data.

To carry out the comparison of the first image data with the first reference data, which can comprise image data and also, in particular, dimensions, software that is suitable for object recognition and a corresponding method such as, in particular, a Hough transform, can appropriately be used. This also applies to the method described below according to a second embodiment of the invention.

The first signal can appropriately be, in particular, an optical and/or acoustic signal, and/or be a control signal that sets the crimping machine into a predetermined operating mode. The crimping machine can here be switched off and/or halted, and/or it can be placed into an idle state and/or standby mode and/or an operating mode.

Particularly advantageously, the detection of the first image data and the first comparison and the checking of the first criterion and the output of the first signal are carried out before the cable is crimped with the contact sleeve. In this way, crimping with an inadequate quality caused by a contact sleeve that is faulty and/or has defects, and/or by a contact sleeve that is not provided for crimping to the cable, and/or not provided for crimping with a crimping height that has been set, can advantageously be prevented.

Through the advantageous checking of the first criterion before the crimping is carried out, reject crimps having inadequate quality can accordingly be significantly reduced, in addition to which carrying out unwanted crimps with unwanted and superfluous time expenditure can be avoided, with the consequence that the present method is particularly economically advantageous.

The first optical sensor appropriately acquires first image data of an outer edge and of an inner edge of the contact sleeve, wherein the inner edge of the contact sleeve surrounds a core of the cable inserted into the contact sleeve. Image data of the outer edge and of the inner edge of the contact sleeve can be particularly easily and reliably acquired and evaluated. Image data of the outer and, in particular, of the inner edge of the contact sleeve is, moreover, particularly advantageous for a combination of the first embodiment of the invention described above with the second embodiment of the invention described below. The inner edge of the contact sleeve is, namely, an outer edge of a contact chamber for accommodating a core of a stripped cable.

According to a second embodiment of the invention, a method is provided for ensuring and/or checking the quality of a crimp making use of a crimping machine for crimping a cable with a contact sleeve, wherein a second optical sensor for acquiring and/or recording second image data of the cable is advantageously used, and wherein suitable evaluation electronics, which can be connected for signaling and/or data transfer to an electronic controller, are used for evaluating the second image data.

What has been said above regarding the control and evaluation electronics, the first optical sensor, the cable and the contact sleeve of the first embodiment of the invention applies to the electronic control and evaluation electronics used, the second optical sensor used, the cable and the contact sleeve of the second embodiment of the invention.

In a step of the method of the second embodiment of the invention, the second image data of the cable are acquired by the second optical sensor, whereupon the evaluation electronics carry out a second comparison of the second image data of the second optical sensor with second reference data of a predetermined cable. As in the first embodiment of the invention, the second optical sensor is connected to the evaluation electronics for signaling and/or data transfer, while suitable software routines for evaluating the image data can be provided on the evaluation electronics.

In a further step, the second comparison is checked for the presence of a predetermined second criterion, after which, in a further step, a second signal is output if the predetermined second criterion is satisfied.

The second reference data referred to above can, as in the previously described method according to the first embodiment of the invention, in particular be image data and/or dimensions of the predetermined cable, which are available for the evaluation electronics.

The predetermined second criterion can, in particular, be a predetermined deviation of the second image data acquired by the second optical sensor from the second reference data.

The second signal, like the previously described first signal, can appropriately be an optical and/or acoustic signal, and/or can be a control signal that sets the crimping machine into a predetermined operating mode. The crimping machine can here be switched off and/or halted, and/or it can be placed into an idle state and/or standby mode and/or an operating mode.

Particularly advantageously, the detection of the second image data and the second comparison and the checking of the second criterion and the output of the second signal are carried out before the cable is crimped with the contact sleeve. In this way, crimping with an inadequate quality caused by a cable that is faulty and/or has defects, and/or by a cable that is not provided for crimping to the contact sleeve and/or not provided for crimping with a crimping height that has been set can advantageously be prevented.

Through the advantageous checking of the second criterion before the crimping is carried out, reject crimps having inadequate quality can accordingly be significantly reduced, in addition to which carrying out unwanted crimps with unwanted and superfluous time expenditure can be avoided, as a consequence of which the present method according to the second embodiment of the invention is also particularly economically advantageous.

The second optical sensor appropriately acquires image data of an inner edge of an insulation of the cable and/or of an outer edge of a core of the cable having the insulation and/or of an outer edge of the insulation of the cable. Image data of, in particular, the edge of the core of the cable can particularly easily and reliably be acquired and evaluated, in particular including the case of a single-core cable having a stranded wire comprising a large number of individual wires.

In addition, image data of the edge of the core of the cable is particularly advantageously in combination with the first image data of the outer and inner edges of the contact sleeve of the first embodiment of the invention described above. It is in this way namely possible to reliably check whether the cable provided for crimping matches the contact sleeve provided for crimping.

The present invention accordingly relates particularly advantageously to a method for ensuring and/or checking the quality of a crimp with the steps, described above, of the first embodiment of the invention and, in addition, with the steps of the second embodiment of the invention, wherein, moreover, a further comparison of the first image data with the second image data can appropriately be carried out.

The further comparison can check for the presence of a predetermined further criterion, wherein a further signal can be output if the further criterion is satisfied. The further signal, like the first and second signal, can be an optical and/or acoustic signal and/or a control signal as described above.

In a method according to an embodiment of the invention, moreover, at least one third optical sensor can appropriately be used to acquire and/or record third image data of the contact sleeve and of the cable, wherein the third image data of the contact sleeve and of the cable are acquired by the third optical sensor, and the evaluation electronics can carry out a third comparison of the third image data of the third optical sensor with third reference data.

The third comparison can appropriately check for the presence of a predetermined third criterion, whereupon a third signal can be output if the predetermined third criterion is satisfied.

The detection of the third image data and the third comparison and the checking of the third criterion and the output of the third signal are carried out here after the cable has been crimped with the contact sleeve. In this way the possibility is advantageously created of also optically monitoring the result of a crimping that has been carried out. The third signal, like the previously described first and second signals, can appropriately be an optical and/or acoustic signal, and/or be a control signal that sets the crimping machine into a predetermined operating mode.

The third optical sensor can, like the first and second optical sensors, be a camera, wherein longitudinal image data of a side view of the cable crimped with the contact sleeve is appropriately acquired by the third optical sensor, wherein the third image data can be a single image and/or a video sequence. Two optical sensors can appropriately be used here that acquire longitudinal image data of the cable crimped with the contact sleeve from different perspectives. An appropriate third optical sensor can also be provided by a laser scanner.

In the method according to embodiments of the invention described above, the predetermined cable and the predetermined contact sleeve for carrying out a predetermined crimping are first selected, and a suitable, predetermined crimping height is set. Suitable insulation stripping of the cable is in addition set if a crimping machine with an insulation-stripping device is used.

The evaluation electronics can easily be programmed for the predetermined cable and the predetermined contact sleeve, wherein the first and/or second and/or third reference data can be selected by the evaluation electronics from a large number of predetermined first and/or predetermined second and/or predetermined third reference data.

In this way the crimping machine and the evaluation electronics can be configured particularly easily in order to carry out reliably a previously described method for ensuring and/or checking the quality of a crimp.

As described above, the first and/or second and/or third signal can initiate an idle state and/or a standby mode and/or an operating mode of the crimping machine, wherein the signal can also appropriately be shown on a screen together with the acquired first and/or second and/or third acquired image data. In this way, a particularly easy operation of the crimping machine is provided to an operator.

The first and/or second and/or third signal can, moreover, comprise a corresponding first and/or second and/or third parameter, and/or the previously described programming of the evaluation electronics for the predetermined cable and the predetermined contact sleeve can comprise a corresponding fourth and fifth parameter, wherein the said parameters can in each case advantageously be used in further methods for ensuring and/or checking the quality of a crimp.

The first and/or second and/or third and/or fourth and/or fifth parameter can be taken into consideration by the evaluation electronics, in particular in a method for checking the quality of a crimp of the cable with the contact sleeve, making use of a sensor system for measuring a force and displacement of a device for actuating and/or applying pressure to a crimping unit and of the evaluation electronics, in which, during the crimping, a force/displacement curve is acquired and displayed on a screen, and a conclusion as to the quality of the crimp drawn from the profile of the force/displacement curve.

In a method of this type, a qualitative fault analysis of the crimping can in particular also be derived from a comparison of the force/displacement curve with a reference model. In this way it is possible to identify fault causes such as, for example, operating errors, faulty materials and, in particular, also a technical malfunction of the crimping apparatus used, and to rectify it promptly and economically. The qualitative fault analysis can be carried out here making use of stored information regarding the assessment of force/displacement curves of faulty crimps.

A qualitative and, in particular, automated analysis can, for example, lead to the result that a crimp blank that is too large, with a contact sleeve that is too large, was used, or that the stranded wire of the cable was impaired during the insulation stripping of a cable or during insertion of a cable into a contact sleeve. The result of the analysis can appropriately and advantageously be displayed on the screen together with the force/displacement curve.

An analysis as above can here be carried out and/or checked particularly accurately and reliably using the first and/or second and/or third and/or fourth and/or fifth parameter, wherein it is particularly advantageously possible to distinguish between material faults and operating errors and/or technical malfunctions as the cause of the fault.

A method according to an embodiment of the invention as described above is particularly suitable for monitoring the operating state of an indent crimping device of a crimping machine described below, which can preferably be a two-mandrel crimping device and, particularly preferably, a four-mandrel crimping device, and is particularly suitable for crimping turned contact sleeves.

The present disclosure moreover accordingly relates in particular to a crimping machine that is configured to carry out a method according to embodiments of the invention as described above, wherein the crimping machine can in particular comprise the first optical sensor and/or the second optical sensor and/or at least one third optical sensor.

A suitable crimping machine as referred to above can in particular advantageously be fitted with a spiral conveyor for feeding a plurality of contact sleeves provided for crimping with a cable, wherein the spiral conveyor can appropriately comprise a feed rail by means of which the contact sleeves are fed to the crimping machine in a predetermined orientation.

The first optical sensor can advantageously be provided at the feed rail for acquiring the first image data of the contact sleeve. The possibility is simply created by this arrangement of acquiring image data of a contact sleeve from a predetermined orientation, and thereby in particular of acquiring image data of an outer edge and an inner edge of the contact sleeve, wherein the inner edge of the contact sleeve that is crimped with a cable surrounds a core of the cable inserted into the contact sleeve.

A suitable crimping machine as described above can, furthermore, comprise an insulation-stripping device for stripping the insulation from the cable provided for crimping with the contact sleeve, and an opening for manually feeding the cable for insulation stripping and subsequent crimping of the cable by means of a crimping device.

The second optical sensor can here advantageously be provided at the above-mentioned opening, wherein the optical sensor can also be arranged at the opening in such a way as to pivot. With this arrangement, the second optical sensor can acquire the second image data of the inner edge of the insulation of the single-core cable and/or of the outer edge of the core of the cable provided with insulation and/or of an outer edge of the insulation of the cable, particularly reliably and with a desirable resolution, before the insulation is stripped from the cable.

An operator who feeds the cable manually to the crimping machine through the opening can here easily feed the cable for acquisition of the second image data by the second optical sensor. The crimping machine can here be designed in such a way that the second optical sensor, after acquisition of the second image data, through carrying out the method according to embodiments of the invention mentioned above and in the presence of a predetermined second criterion, opens and/or blocks the opening for the further feed of the cable to the insulation-stripping device and for subsequent crimping with the contact sleeve. The opening here moreover serves for manual removal of the cable crimped with the contact sleeve.

A suitable crimping machine as referred to above can furthermore comprise the at least one third optical sensor for the acquisition of longitudinally recorded third image data of the cable crimped with the contact sleeve. The third optical sensor can appropriately be arranged at the above-described opening of the crimping machine in such a way that it acquires a single image and/or a video sequence of the cable crimped with the contact sleeve. The acquisition of the image data can here take place easily during a manual removal of the cable crimped with the contact sleeve.

Two third optical sensors can appropriately be provided at the opening, and acquire the longitudinal image data, or side views, of the cable crimped with the contact sleeve from different perspectives. An appropriate third optical sensor can also be provided by a laser scanner.

A suitable crimping machine can further comprise a sensor system for measuring a force and a displacement of a device for actuating and/or subjecting the crimping device to pressure and suitably configured control and evaluation electronics and a screen, so that a force/displacement curve can be acquired and displayed on a screen during the crimping, and a conclusion as to the quality of the crimp can be reached from the profile of the force/displacement curve.

The crimping device mentioned above of the crimping machine can, in particular, be an indent crimping device and, preferably, be a two-mandrel crimping device and, particularly preferably, a four-mandrel crimping device, and thus be particularly suitable for crimping the cable with a turned contact sleeve.

A crimping machine as mentioned above is thus suitable for carrying out a method according to embodiments of the invention, wherein a software program suitable for carrying out the method can appropriately be provided in the control and evaluation electronics of the crimping machine. It is clear that the control and evaluation electronics comprise means suitable for this purpose such as, for example, a memory facility for recording data.

A suitable crimping machine can, moreover, comprise interfaces for wired and/or wireless signal and/or data transfer connections. In this way the crimping machine can be networked, and the first and/or second and/or third signal can accordingly be a predetermined message that can be sent to external equipment. Such a message as mentioned above can, for example, be made to a mobile telephone of a service technician, and the possibility of advantageously prompt servicing of the crimping machine accordingly provided.

BRIEF DESCRIPTION OF THE SEVERAL VIEWS OF THE DRAWINGS

Exemplary embodiments of the invention are illustrated in the drawings and are explained in more detail below, in which.

Figure 1A:
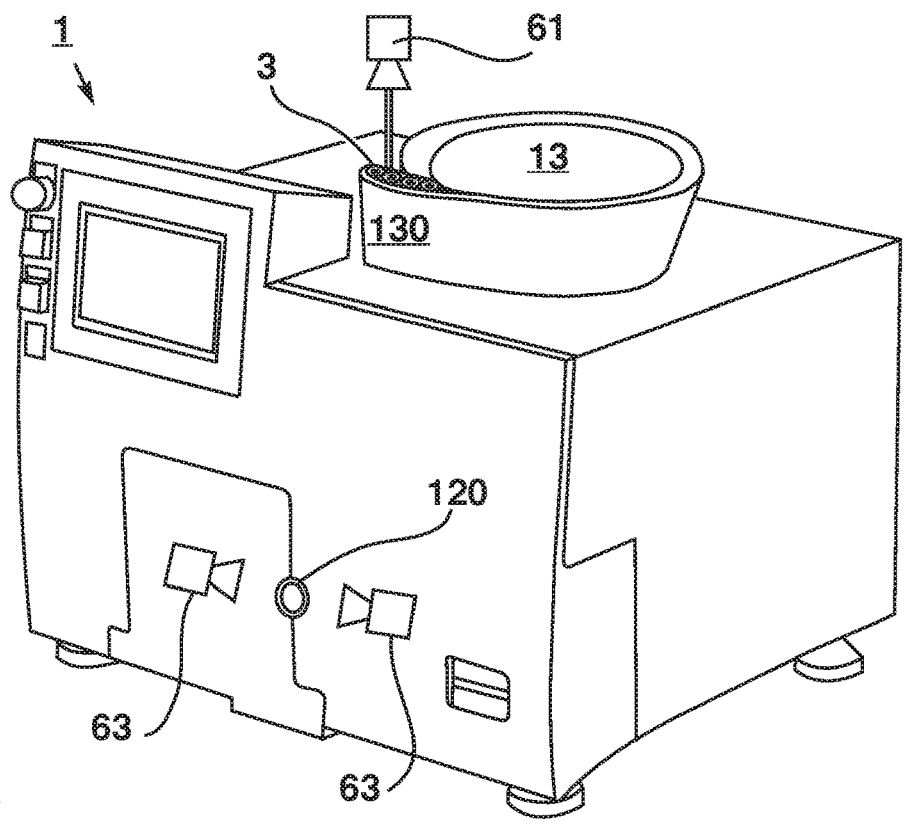
FIG. 1A shows a schematic illustration of a crimping machine according to one embodiment of the invention.

The figures may partially contain simplified, schematic illustrations. Identical reference signs are used in some cases for elements that are equivalent but that may not be identical. Different views of the same elements can be shown on a different scale. For the sake of simplicity and clarity, only an equivalent or similar element is given the same reference sign in the drawings.

DETAILED DESCRIPTION

Figure 1B:
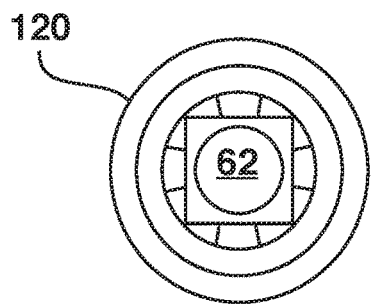
FIG. 1B shows a magnified illustration of an opening of the crimping machine of FIG. 1A for inserting a cable to be crimped.
Figure 1C:
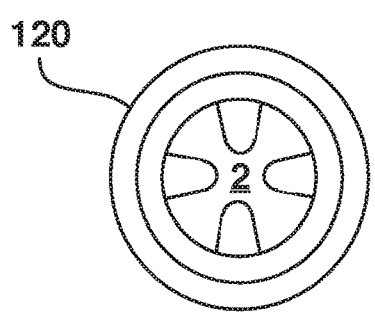
FIG. 1C shows a further illustration of the opening of FIG. 1B.
Figure 1D:
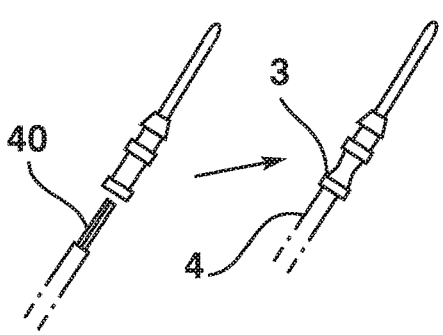
FIG. 1D shows a cable with a contact sleeve, loose and crimped together.

FIG. 1A shows a schematic illustration of a crimping machine 1 according to one embodiment of the invention, that is suitable for crimping a cable 4 illustrated in FIG. 1D with a contact sleeve 3. For automatically feeding the contact sleeves 3 that are to be crimped, a spiral conveyor 13 with a feed rail 130 is provided at the crimping machine 1, by which the contact sleeves 3 are fed to the crimping machine 1 in a predetermined orientation. An edge of the contact sleeves 3 lined up adjacently in the feed rail 130 has an inner edge 31 and an outer edge 32, and is visible from above.

Figure 1E:
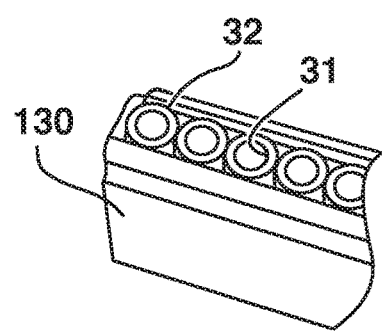
FIG. 1E shows a magnified illustration of a feed rail of the crimping machine of FIG. 1A with contact sleeves to be crimped.

A first optical sensor 61 for acquiring first image data for carrying out a method according to an embodiment of the invention for ensuring and/or checking the quality of a crimp described above is arranged above the feed rail 130. FIG. 1E shows a magnified illustration of the feed rail 130 with contact sleeves 3 arranged in the feed rail 130.

Not shown in the drawings, an insulation-stripping device and a crimping device 2 are provided in the interior of the crimping machine 1. The crimping machine 1 has an opening 120 for manually feeding a cable 4 for insulation-stripping and subsequent crimping of the cable 4 with a contact sleeve 3. A magnified illustration of the opening 120 with a visible region of the crimping device 2 which is accessible via the opening 120 is shown schematically in FIG. 1C. Illustrated schematically in FIG. 1B, a second optical sensor 62 for the acquisition of second image data of a cable 4 to be crimped, for carrying out a method described above according to one embodiment of the invention, is provided at the opening 120 in the interior of the crimping machine 1.

The second optical sensor 62 is appropriately arranged in a pivoting manner at the opening 120 in such a way that second image data of an inner edge 41 of an insulation of the cable 4 and/or of an outer edge 41 of a core of the cable 4 having the insulation and/or of an outer edge 42 of the insulation of the cable 4 can be acquired. To acquire the second image data, the cable 4 is held by an operator in front of the second optical sensor 2 for its insertion in the proper manner into the interior of the crimping machine 1.

The sensor 62 can be arranged in a pivoting manner at the opening 120 in such a way that after carrying out a method as described above according to an embodiment of the invention, and with recognition of the presence of a predetermined second criterion, the opening 120 is enabled by pivoting the second optical sensor 62 for further manual insertion of the cable 4 into the interior of the crimping machine 1 to the insulation-stripping device and the crimping device 2.

Two third optical sensors 63 for the acquisition of third longitudinal image data of a side view of a cable 4 crimped with a contact sleeve 3 are moreover provided at the opening 120 of the crimping machine 1, wherein the third image data can be a single image and/or a video sequence. The optical sensors 63 are arranged in such a way that the longitudinal image data of the cable 4 and of the contact sleeve 3 are acquired from various perspectives. In a method described above according to an embodiment of the invention, the third image data are acquired as single images and/or as video sequences by the optical sensors 63 during manual removal of the contact sleeve 3 crimped with the cable 4.

The first optical sensor 61 and/or the second optical sensor 62 can, in particular, be a first and/or second camera, and the two third optical sensors 63 can each be provided by a third camera and/or be provided by a laser scanner.

FIG. 1D shows a cable 4 with a contact sleeve 3, respectively loose and crimped together. The contact sleeve 3 is a turned contact sleeve 3, and the cable is a single-core cable 4 with a stranded wire comprising a plurality of individual wires 40. The contact sleeve 3 and the cable 4 are particularly suitable for crimping with the crimping machine 1.

Figure 2A:
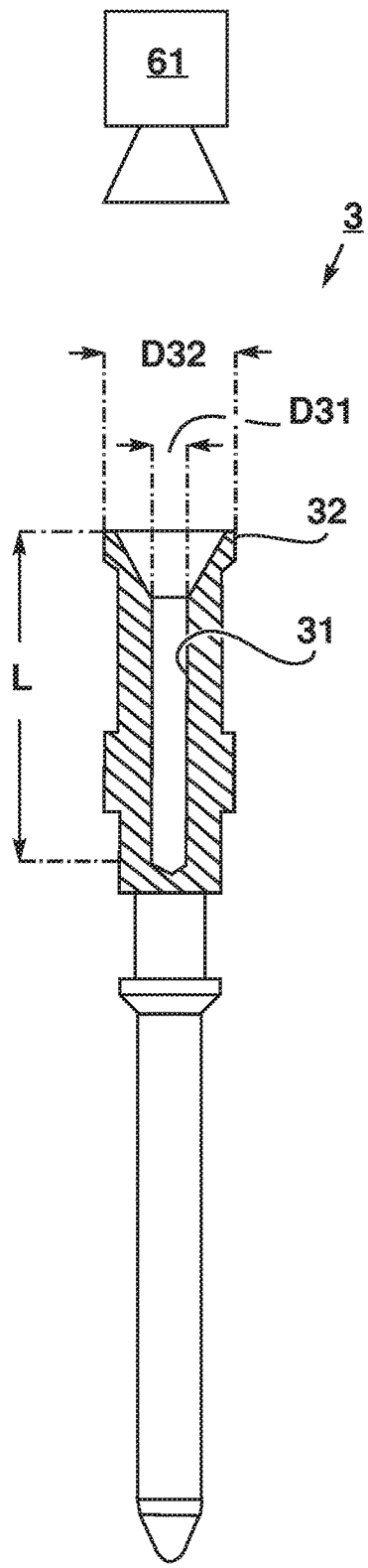
FIG. 2A shows a magnified illustration of a contact sleeve, partly cutaway, together with a first optical sensor.
Figure 2B:
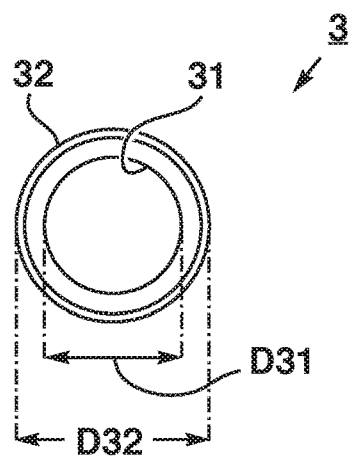
FIG. 2B shows a plan view of an opening of a contact sleeve.
Figure 2C:
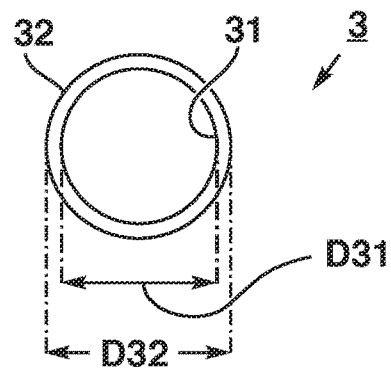
FIG. 2C shows a plan view of an opening of a further contact sleeve.

FIG. 2A shows a magnified illustration of a contact sleeve 3, partly cutaway, together with the first optical sensor 61. FIG. 2B shows a plan view of an opening of a contact sleeve 3 for the insertion of a core of a cable 4 from which the insulation has been stripped into the contact chamber of the contact sleeve 3 with the length L, while FIG. 2C shows a plan view of an opening of a further contact sleeve 3. The contact sleeves 3 are turned contact sleeves 3 that are suitable for crimping with the crimping machine 1.

The first optical sensor 61 is arranged with its optical axis parallel to the central axis of the contact sleeve 3 in such a way that first image data of the circular inner edge 31 and of the circular outer edge 32 of the contact sleeve 3 can be acquired particularly reliably, and with a desirable resolution, by the first optical sensor 61.

The circular inner edge 31 has a diameter D31, and the circular outer edge 32 has a diameter D32.

Making use of suitable software routines referred to above of a method according to an embodiment of the invention, the diameter D31 and D32 and the cross-section corresponding to the diameter D31 and D32 can be determined easily from the acquired first image data. According to one embodiment of the invention, the dimensions of the contact sleeve 3 can in this way be ascertained with a desirable accuracy.

The first image data acquired, and the dimensions of the contact sleeve 3 ascertained from the acquired image data, are particularly suitable for a comparison, as described above, with reference data of a predetermined contact sleeve 3, wherein the reference data can be image data and/or dimensions of the predetermined contact sleeve 3.

The opening of the contact sleeve 3 of FIGS. 2A and 2B is designed in the form of a funnel for easy insertion of a core of a cable 4 from which the insulation has been stripped.

Figure 2D:
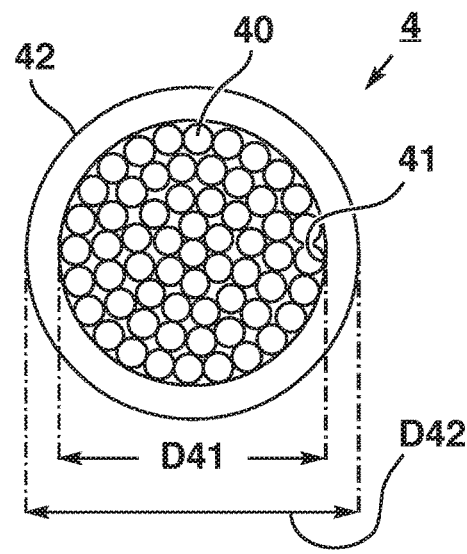
FIG. 2D shows a magnified illustration of an insulated, single-core cable with a stranded wire comprising a plurality of individual wires.

FIG. 2D shows a magnified illustration of an insulated, single-core cable 4 with a stranded wire comprising a plurality of individual wires 40. The insulation of the cable 4 has an outer edge 42 and an inner edge 41, wherein the inner edge 41 is the outer edge of the stranded wire.

The second optical sensor 62 that is provided at the opening 120 of the crimping machine 1 is arranged with its optical axis at the opening 120 in such a way that second image data of the circular outer edge 42 of the insulation and, in particular, second image data of the circular inner edge 41 of the insulation of the cable 4, can be acquired particularly reliably and with a desirable resolution by the second optical sensor 62.

The circular inner edge 41 of the insulation, which is the outer edge of the stranded wire, has a diameter D41, and the circular outer edge 42 of the insulation has a diameter D42. Making use of suitable software routines, referred to above, of a method according to an embodiment of the invention, the diameter D41 and D42 and the cross-section corresponding to the diameter D41 and D42 can be determined easily from the acquired second image data. According to one embodiment of the invention, the dimensions of the cable 4 and, in particular, the core of the cable 4, can in this way be ascertained with a desirable accuracy by f a method according to an embodiment of the invention. To carry out a method according to an embodiment of the invention as described above, the diameter D41, and the cross-section of the stranded wire that corresponds to it, is of particular interest here.

The second image data acquired above and the dimensions of the cable 4 ascertained from the image data are suitable for a comparison, as described above, with reference data of a predetermined cable 4, wherein the reference data can be image data and/or dimensions of the predetermined cable 4. With a method according to an embodiment of the invention as described above, the diameter D41 and the cross-section of the stranded wire of the cable 4 corresponding to it can moreover each be compared with the diameter D31 described above and the cross-section of the contact sleeve 3 corresponding to the diameter D31.

This comparison can here again be checked for the presence of a predetermined criterion, and a predetermined signal output if the criterion is satisfied. The predetermined criterion can appropriately be a predetermined deviation of the diameter D31 from the diameter D41 that is found on a cable 4 not suitable for a contact sleeve 3, according to which the signal can, for example, initiate an idle state of the crimping machine 1.

FIGS. 3A to 3E each show a side view of a cable 4 incorrectly crimped with a contact sleeve 3. The side views of FIG. 3A to 3E each correspond to third longitudinal image data acquired by a third optical sensor 63 of a cable 4 crimped with a contact sleeve 3. The third image data are compared here with predetermined third reference data, wherein the third reference data can in particular be image data of a predetermined segment A with reference image data characterizing a faulty and/or a correct crimping.

Figure 3A:
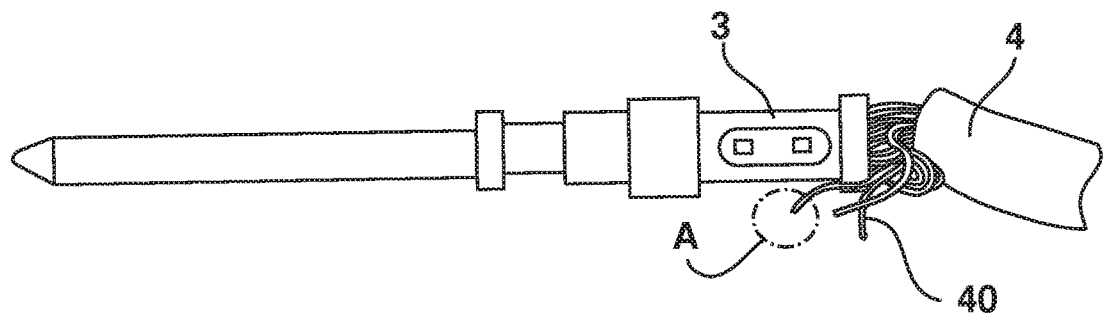
FIG. 3A to FIG. 3E each show a side view of a cable incorrectly crimped with a contact sleeve.

In the faulty crimping of FIG. 3A, the individual wires 40 of the stranded wire of the single-core cable 4 are not inserted into the contact sleeve 3 and are located on the insulation of the cable 4 and on the contact sleeve 3, and, moreover, protrude from the cable 4 and the contact sleeve 3.

To recognize a faulty crimping of this sort, reference image data of the segment A of FIG. 3A are particularly advantageously suitable, wherein the reference image data characterize a faulty crimping.

Unlike in FIG. 3A, FIGS. 3B to 3E each show just one segment of the contact sleeve 3 that is particularly interesting for a method as described above according to one embodiment of the invention. Appropriately in the method, again only a segment of a side view of the cable 4 crimped with a contact sleeve 3, which segment is of interest for carrying out a comparison with the predetermined third reference data is acquired by the third optical sensor 63.

Figure 3B:
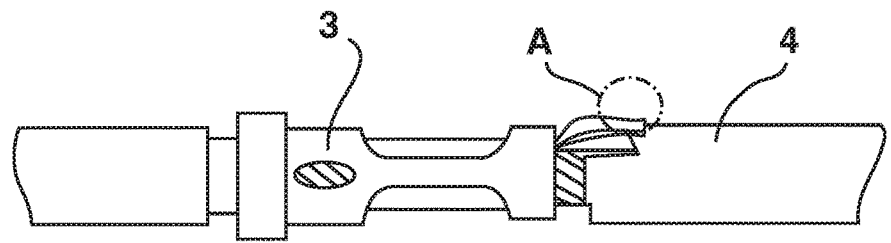

In the faulty crimping of FIG. 3B, the individual wires 40 of the stranded wire of the single-core cable 4 are not inserted into the contact sleeve 3 and are located on the insulation of the cable 4. To recognize a faulty crimping of this sort, reference image data of the segment A of FIG. 3B are particularly advantageously suitable, wherein the reference image data of the segment A characterize a faulty crimping.

Figure 3C:
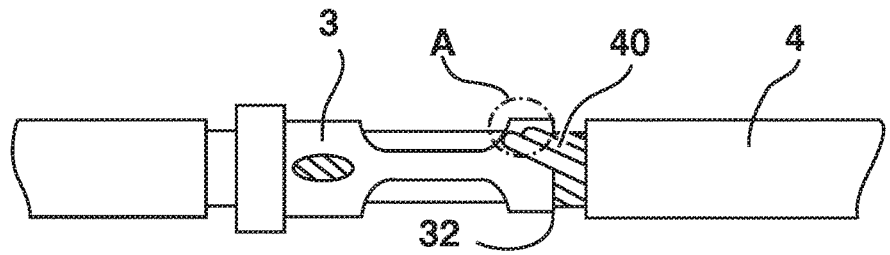

In the faulty crimping of FIG. 3C, the individual wires 40 of the stranded wire of the single-core cable 4 are not inserted into the contact sleeve 3 and are located on the contact sleeve 3. To recognize a faulty crimping of this sort, reference image data of the segment A of FIG. 3C are particularly advantageously suitable, wherein the reference image data of the segment A characterize a faulty crimping.

Figure 3D:
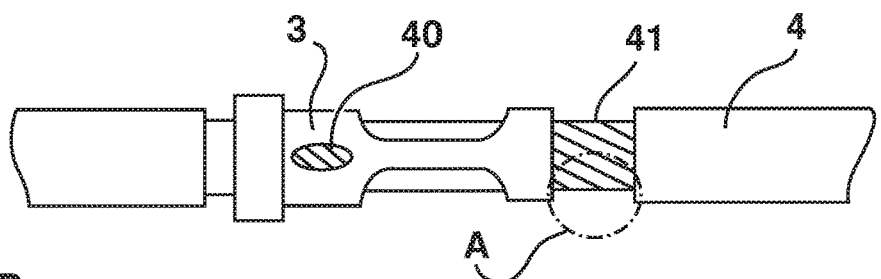

In the faulty crimping of FIG. 3D, the insulation of the single-core cable 4 has been removed over too great a length To recognize a faulty crimping of this sort, reference image data of the segment A of FIG. 3D are particularly advantageously suitable, wherein the reference image data of the segment A characterize a faulty crimping.

Figure 3E:
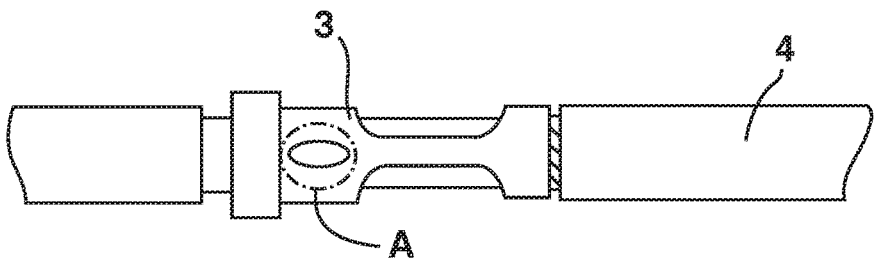

In the faulty crimping of FIG. 3E, the insulation of the single-core cable 4 has been removed over too short a length to recognize a faulty crimping of this sort, reference image data of the segment A of FIG. 3E are particularly advantageously suitable, wherein the reference image data of the segment A characterize a faulty crimping. The contact sleeve 3 of the crimping of FIGS. 3B to 3E has, namely, a hole in which the stranded wire of the cable 4 should be visible if the insulation of the cable 4 has been correctly stripped.

Figure 3F:
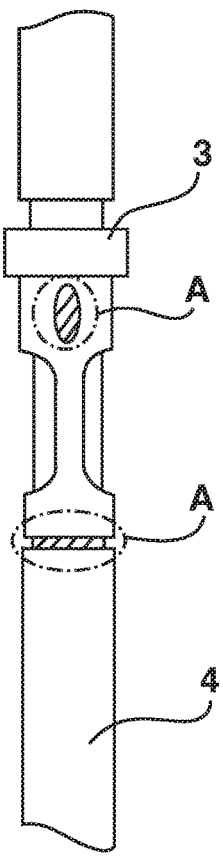
FIG. 3F shows a side view of a cable correctly crimped with a contact sleeve.

FIG. 3F shows an interesting segment of a cable 4 correctly crimped with a contact sleeve 3. To recognize a correct crimping of this sort, reference image data of the segments A of FIG. 3F are particularly advantageously suitable, wherein the reference image data of the segments A characterize a correct crimping.

Figure 4A:
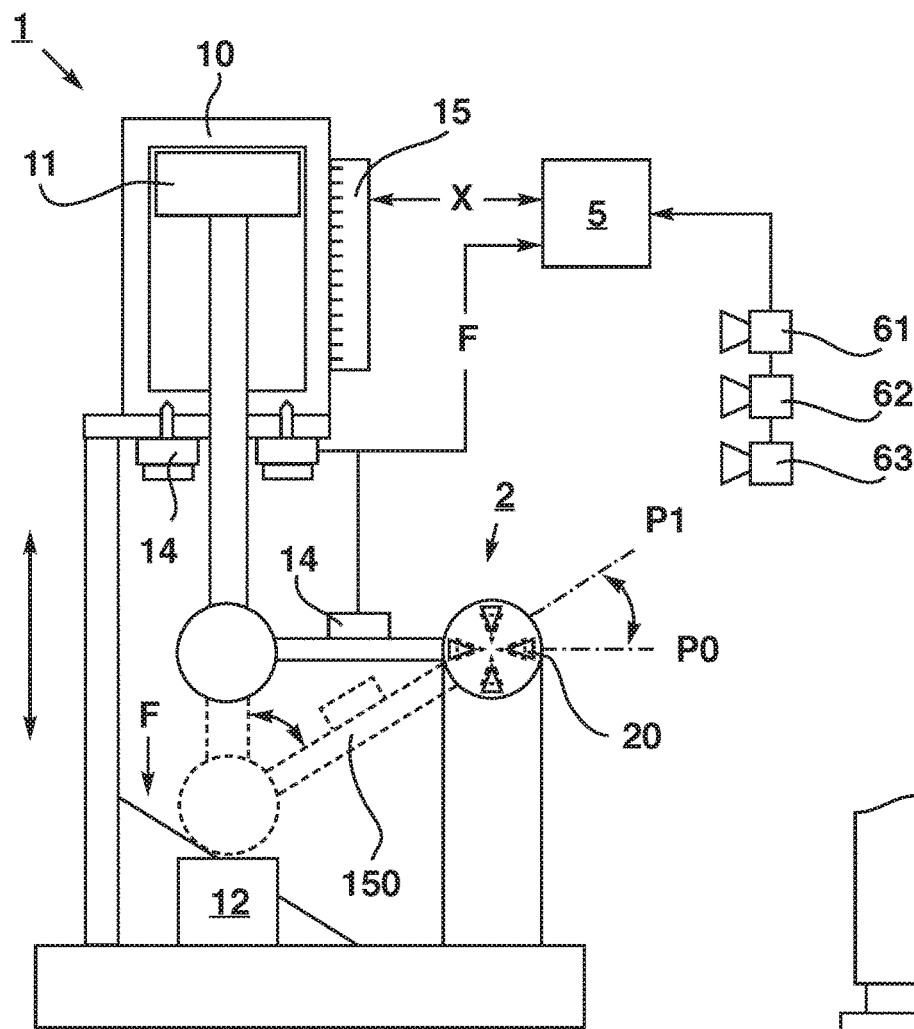
FIG. 4A shows a schematic illustration of important components of the crimping machine of FIG. 1A according to one embodiment of the invention with a crimping device.

FIG. 4A shows a schematic illustration of the important components of a crimping machine 1 according to one embodiment of the invention, with a crimping device 2.

The crimping device 2 is an indent crimping apparatus and, in particular, a four-mandrel crimping apparatus with a crimping device 2 comprising four pressing elements 20, which is particularly suitable for pressing a cable the insulation of which has been stripped or a stranded wire of a single-core cable 4 the insulation of which has been stripped with a turned contact sleeve 3. The pressing elements 20 are appropriately designed as tapered mandrels 20.

To actuate the crimping device 2, the crimping machine 1 comprises a pneumatic compression device with a cylinder 10 and a piston 11 that is operatively connected with the crimping device 2 via a lever 150. A suitable adjusting mechanism 12 which can comprise an adjustable stop for the lever 150 is provided for setting up a predetermined crimping height by adjusting mandrels.

When crimping by pressing an in particular turned contact sleeve 3 with a cable 4, the contact sleeve 3, with the stranded wire of the cable 4 located inside it, is inserted in the correct manner into the crimping device 2, and the crimping device 2 is actuated by the compression device and subjected to compression. By a vertical movement and a vertically acting force F of the compression device, the lever 150 that is coupled to the crimping device 2 is pivoted. The crimping device 2 and the lever 150 are designed and arranged here in such a way that as a result of the pivoting the mandrels 20 move out of their idle position P0 toward each other, or are brought to their idle position P0, as is described below with reference to FIG. 1B. The tips of the mandrels 20 are each located here on concentric circles, as is described below with reference to FIGS. 5B and 5C.

The crimping machine 1 is appropriately configured to check the quality of a crimp of a predetermined cable 4 with a predetermined contact sleeve 3, and comprises a displacement sensor 15 and at least one force sensor 14 for this purpose. The displacement sensor 15 can appropriately be a position transmitter with a Hall sensor and be provided at the cylinder 10 of the compression device. The force sensor 14 can appropriately be a piezo sensor 14 and be arranged at the lever 150 and/or be at least one piezo sensor provided at a fastening of the cylinder 10. The piezo sensors here each measure an extension or a stress when the lever 150 is actuated or the reaction force acting on the cylinder 10 of a pressure acting on the piston 11.

The sensor system 14, 15 is connected for signaling and/or data transfer to evaluation electronics 5. The evaluation electronics 5 can control a screen and can display a force/displacement curve G of a crimp acquired making use of the signals of the sensor system 15, 14, together with further information, on the screen. Examples of a force/displacement curve G are described below with reference to FIGS. 5A and 6A.

The first optical sensor 61 and the second optical sensor 62 and the at least one third optical sensor 63 described with reference to FIG. 1A are, like the sensor system 15, 14, connected to the evaluation electronics 5 for signaling and/or data transfer.

Figure 4B:
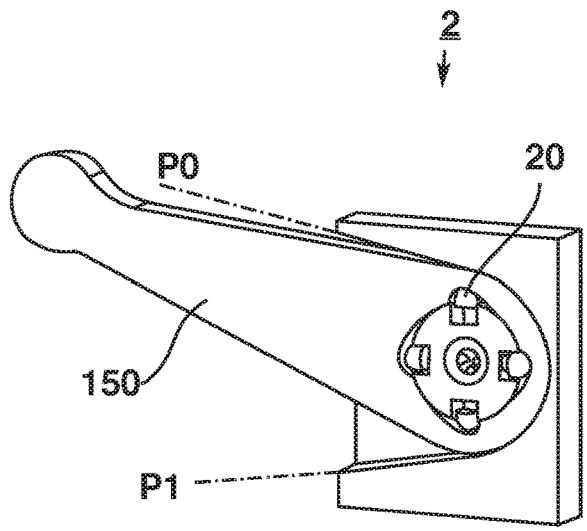
FIG. 4B shows a magnified view of the crimping device of FIG. 4A.

FIG. 4B shows a magnified, detailed illustration of the crimping device 2. For the sake of clarity, the force sensor 14 on the lever 150 is not illustrated in FIG. 4B.

The crimping device 2 comprises a cylindrical guide in which four mandrels 20 are mounted in a radially movable manner. The tips of the mandrels 20 are aligned in opposition to one another. The lever 150 can be axially pivoted or rotated on the cylindrical guide and has an internal contour that interacts with heads of the mandrels 20 protruding from the cylindrical guide.

When the lever 150 is pivoted, the tips of the mandrels 20 are moved towards one another in the direction of the axis of the cylindrical guide or of the pivot axis of the lever 150, or away from one another. The tips of the mandrels 20 here each lie on concentric circles. During a crimping, a contact sleeve 3 having a cable 4 is pressed in this way to the axis of the cylindrical guide with the cable 4 by actuating the lever 150.

A crimping machine 1 with the above-described components is suitable for carrying out a method according to one embodiment of the invention as described above, wherein the crimping machine 1 also comprises an insulation device for stripping insulation off a cable 4, not shown in FIG. 4A, and a spiral conveyor 13 for feeding contact sleeves 3.

Figure 5A:
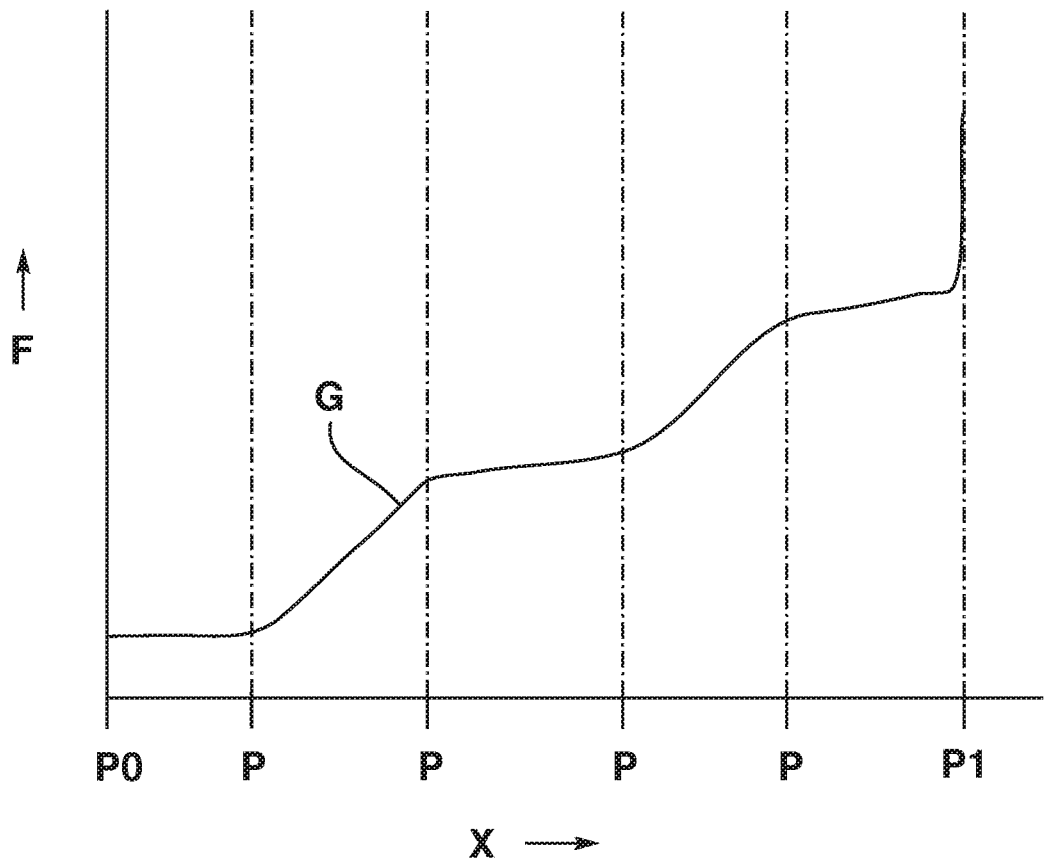
FIG. 5A shows a force/displacement curve recorded with the crimping machine of a crimp according to one embodiment of the invention.

FIG. 5A shows a force/displacement curve G of a crimp carried out by a crimping machine 1 of FIGS. 1A and 4A of a contact sleeve 3 with a cable 4 according to one embodiment of the invention.

During the crimping, the mandrels 20 of the crimping device 2 are moved from their idle position P0 into further positions P to P1, wherein the tips of the mandrels 20 move towards one another, each being arranged at that time on concentric circles. A displacement X and a force F are here measured by the sensor system 15, 14 and are illustrated on the force/displacement curve G. The positions P0, P, P1 each correspond to particularly characteristic positions P of the mandrels 20 for the profile of the force/displacement curve G and its analysis for assessment of the quality of a crimp, and here each correspond to a measured displacement X of the sensor 15.

Figure 5B:
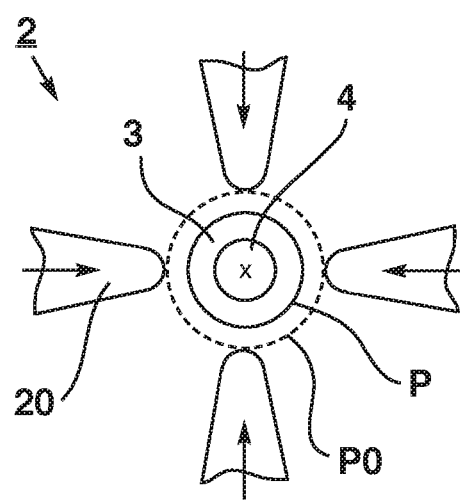
FIG. 5B shows a magnified illustration of the crimping device of FIG. 4A in a first position, together with a contact sleeve arranged correctly for crimping, and a cable.

FIG. 5B shows a magnified illustration of the crimping device 2 of FIG. 4A in the idle position P0, together with a contact sleeve 3 correctly arranged for crimping in the crimping device 2, and a cable 4. The tips of the mandrels 20 of the crimping device 2 are here arranged concentrically with the contact sleeve 3 and the cylindrical guide of the crimping device 2.

A displacement of the mandrels 20 from the position P0 to the position P, adjacent in FIG. 5A to the position P0, takes place here due to the application of a constant force F. Accordingly, the profile of the force/displacement curve G is also constant in a first region P0-P between the position P0 and the position P of the mandrels 20, in which the mandrels 20 of the crimping device 2 touch the surface of the contact sleeve 3.

Figure 6A:
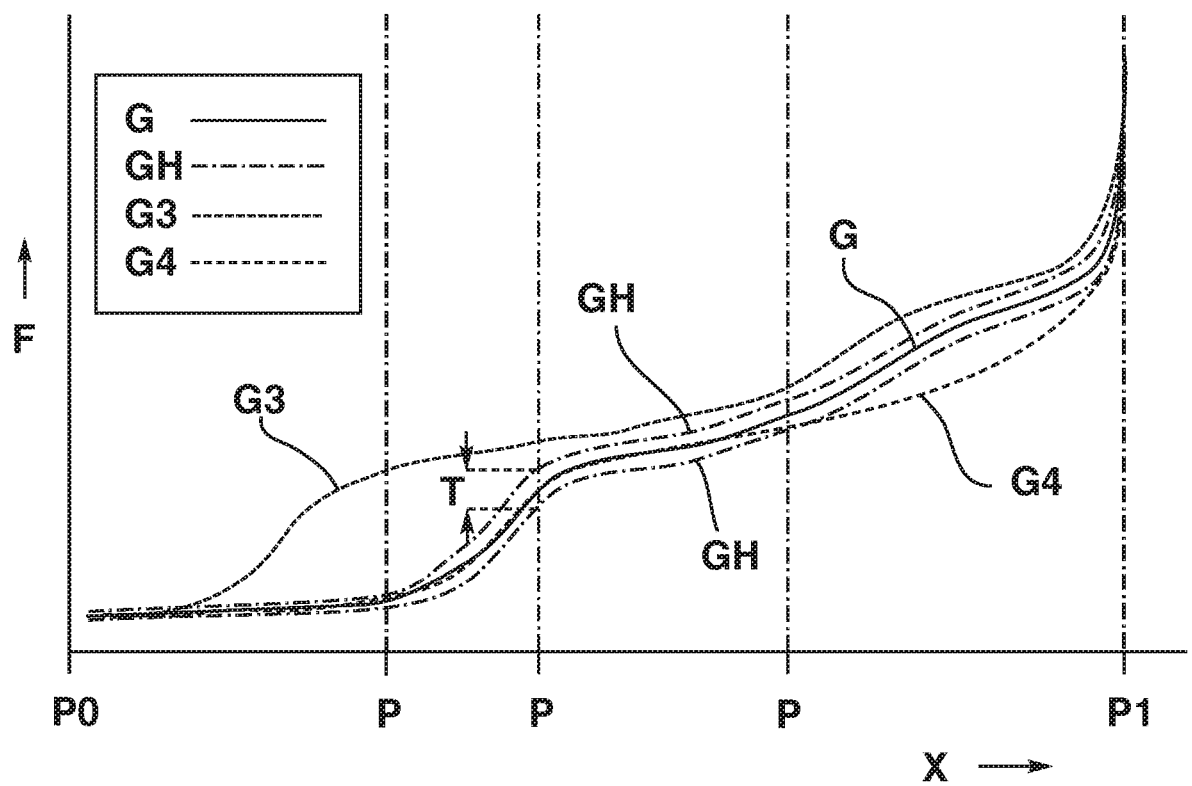
FIG. 6A shows further force/displacement curves of a crimp together with two envelope curves of a reference model according to one embodiment of the invention.
Figure 6B:
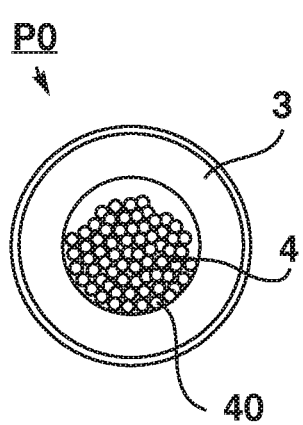
FIG. 6B shows a magnified section through the contact sleeve of FIG. 5B with a cable correctly provided for crimping.

FIG. 6B shows an illustration that is magnified and more detailed in comparison with FIG. 5B of a section through a contact sleeve 3 that is provided correctly for crimping with a cable 4. In addition to individual wires 40 of the stranded wire of the cable 4, the interior of the contact sleeve 30 has a cavity that is not occupied by the individual wires 40 of the stranded wire. The contact sleeve 3 is undamaged, and its state corresponds to the contact sleeve 3 of FIG. 5B in the region P0-P of the crimping with the force/displacement curve G.

Figure 5C:
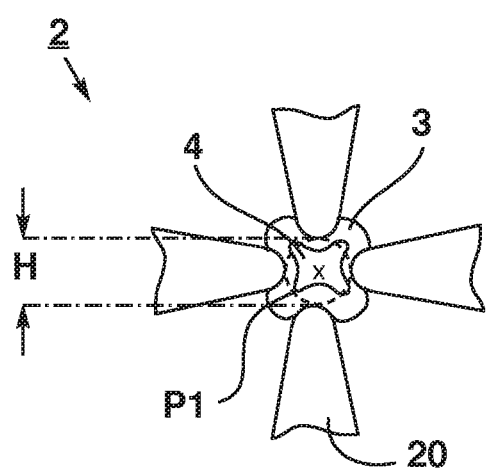
FIG. 5C shows the crimping device with a contact sleeve and the cable of FIG. 5B in a second position with a predetermined crimping height of the crimp.

FIG. 5C shows the mandrels 20 of the crimping device 2 at the position P1 of the mandrels 20 corresponding to the position P1 of the force/displacement curve G, wherein the tips of the mandrels 20 are arranged on a circle with a diameter H that corresponds to the crimping height H that has been set up.

With the mandrels 20 arranged at the position P1, the stranded wire completely fills the space available in the contact sleeve 3.

Figure 6C:
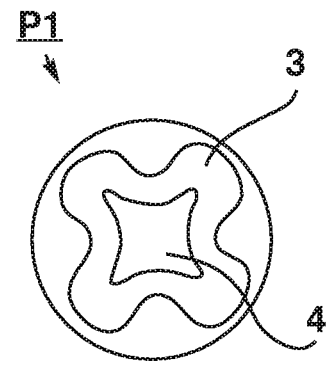
FIG. 6C shows a micrograph of a section through the crimp of the contact sleeve with the cable of FIG. 5C.

This state of the contact sleeve 3 and of the stranded wire is illustrated in a micrograph of the contact sleeve 3 for the region P1 of FIG. 6C, in which no individual wires 40 of the stranded wire can be recognized, and where no empty space is present next to the stranded wire. FIG. 6C here shows a micrograph of a crimp with a desirable, predetermined quality, in which neither individual wires 40 nor cracks in the contact sleeve 3 resulting, for example, from unwanted material faults, can be recognized.

FIG. 6A shows further force/displacement curves G, G3, and G4 of a crimp, together with two envelope curves GH of a reference model that is suitable for checking the quality of a crimp.

The two envelope curves GH are each illustrated in FIG. 6A with dot-dashed lines, and bound a tolerance region T.

The force/displacement curve G of FIG. 6A is shown with a solid line, and its entire profile lies, from the position P0 up to the position P1 of the mandrels 20, between the envelope curves GH, and corresponds to a crimping of a correct contact sleeve 3 with a correct cable 4 with a predetermined, desirable quality.

The force/displacement curve G3 of FIG. 6A is shown with a dashed line, and runs almost entirely above the two envelope curves GH. The force/displacement curve G3 corresponds to a crimping of a contact sleeve 3 that is too large, which is touched and elastically deformed by the mandrels 20 of a crimping unit 2 long before the position P1 planned for a contact of the contact sleeve 3. The force profile F of the force/displacement curve G3 accordingly lies, up to the position P2, well above the tolerance region T.

In the case of a crimping with a force/displacement curve G3, the information that the crimping has an undesirable quality as a result of a contact sleeve 3 of the wrong size can also be shown on a screen of a crimping apparatus 1 next to the curves G3 and GH. Moreover, with a method as described above, a probability of the presence of a fault described above can be calculated from the profile of the force/displacement curve G3 and also shown on the screen.

The force/displacement curve G4 of FIG. 6A is also shown with a dashed line and runs initially within the tolerance region T defined by the two envelope curves GH. Unlike the force/displacement curve G3, the force/displacement curve G4 corresponds to crimping a correct contact sleeve 3 and a cable 4 that is too small, having a stranded wire that is too small and/or that has too few individual wires 40. Due to the stranded wire being too small or having too few individual wires 40, the force profile F lies, after approximately the position P3 of the mandrels 20 described above with reference to FIG. 2A, below a correct force profile F, and outside the tolerance region T defined by the two envelope curves GH.

In the case of a crimping with a force/displacement curve G4, the information that the crimping has an undesirable quality as a result of an incorrectly small cable 4 whose stranded wire has too few individual wires 40, can also be shown on a screen of a crimping apparatus 1 next to the curves G4 and GH. Moreover, with a method as described above, a probability of the presence of a fault described above can be calculated from the profile of the force/displacement curve G4 and also shown on the screen.

In the method described above with reference to FIGS. 5A and 6A for checking the quality of a crimp in which, during the crimping, a force/displacement curve G, G3, G4 is acquired and displayed on a screen, and a conclusion as to the quality of the crimp is reached from the profile of the force/displacement curve G, a further first and/or second and/or third and/or fourth and/or fifth parameter can advantageously be taken into consideration in order to ascertain the tolerance region T, and in particular for an analysis of the force/displacement curve G, and in particular for a fault ascertainment by an embodiment of the method as described above.

The first and/or second and/or third and/or fourth and/or fifth parameters are appropriately each specified by the first and/or second and/or third signal described, and/or specified for the predetermined cable 4 and/or the predetermined contact sleeve 3 by the described programming of the evaluation electronics. A particularly reliable and precise analysis of the force/displacement curve G, in particular also with a desirable fault ascertainment, can be carried out if the parameters referred to above are used.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for ensuring and/or checking the quality of a crimp making use of a crimping machine for crimping a cable with a contact sleeve, making use of a first optical sensor for detecting and/or recording first image data of the contact sleeve, making use of a second optical sensor, distinct from the first optical sensor, for detecting and/or recording second image data of the cable, distinct from the first image data, and making use of evaluation electronics, the method comprising:
acquiring the first image data of the contact sleeve by the first optical sensor;
carrying out, via the evaluation electronics, a first comparison of the first image data of the first optical sensor with first reference data of a predetermined contact sleeve;
checking the first comparison for the presence of a predetermined first criterion;
if the predetermined first criterion is satisfied, outputting a first signal, and
wherein the acquiring of the first image data and the carrying out of the first comparison and the checking of the first comparison for the presence of the predetermined first criterion and the outputting of the first signal are carried out before the cable is crimped with the contact sleeve;
acquiring the second image data of the cable by the second optical sensor;
carrying out, via the evaluation electronics, a second comparison of the second image data of the second optical sensor with second reference data of a predetermined cable;
checking the second comparison for the presence of a predetermined second criterion; and
if the predetermined second criterion is satisfied, outputting a second signal, and
wherein the acquiring of the second image data and the carrying out of the second comparison and the checking of the second comparison for the presence of the predetermined second criterion and the outputting of the second signal are carried out before the cable is crimped with the contact sleeve.

2. The method as claimed in claim 1, wherein the first image data acquired by the first optical sensor are image data of an outer edge and of an inner edge of the contact sleeve, and wherein the inner edge surrounds a core of the cable inserted into the contact sleeve.

3. The method as claimed in claim 2, further comprising:
carrying out a comparison of the first and second image data; and
checking the comparison for the presence of a predetermined further criterion; and
if the predetermined further criterion is satisfied, outputting a further signal.

4. The method as claimed in claim 1, wherein the method for ensuring and/or checking the quality of a crimping of an indent crimping device is used.

5. A method for ensuring and/or checking the quality of a crimp making use of a crimping machine for crimping a cable with a contact sleeve and making use of a second optical sensor, distinct from a first optical sensor, for detecting and/or recording second image data of the cable, distinct from first image data, and making use of evaluation electronics, the method comprising:
acquiring the second image data of the cable by the second optical sensor;
carrying out, via the evaluation electronics, a second comparison of the second image data of the second optical sensor with second reference data of a predetermined cable;
checking the second comparison for the presence of a predetermined second criterion; and
if the predetermined second criterion is satisfied, outputting a second signal, and
wherein the acquiring of the second image data and the carrying out of the second comparison and the checking of the second comparison for the presence of the predetermined second criterion and the outputting of the second signal are carried out before the cable is crimped with the contact sleeve.

6. The method as claimed in claim 5, wherein image data of an inner edge of an insulation of the cable and/or of an outer edge of a core of the cable having the insulation is acquired by the second optical sensor.

7. A method for ensuring and/or checking the quality of a crimp making use of a crimping machine for crimping a cable with a contact sleeve, making use of a first optical sensor for detecting and/or recording first image data of the contact sleeve, making use of a second optical sensor for detecting and/or recording second image data of the cable, making use of at least one third optical sensor for the acquisition and/or recording of third image data of the contact sleeve and of the cable, and making use of evaluation electronics, the method comprising:
acquiring the first image data of the contact sleeve by the first optical sensor;
carrying out, via the evaluation electronics, a first comparison of the first image data of the first optical sensor with first reference data of a predetermined contact sleeve;
checking the first comparison for the presence of a predetermined first criterion; and
if the predetermined first criterion is satisfied, outputting a first signal, and
wherein the acquiring of the first image data and the carrying out of the first comparison and the checking of the first comparison for the presence of the predetermined first criterion and the outputting of the first signal are carried out before the cable is crimped with the contact sleeve:
acquiring the second image data of the cable by the second optical sensor;
carrying out, via the evaluation electronics, a second comparison of the second image data of the second optical sensor with second reference data of a predetermined cable;
checking the second comparison for the presence of a predetermined second criterion; and
if the predetermined second criterion is satisfied, outputting a second signal, and
wherein the acquiring of the second image data and the carrying out of the second comparison and the checking of the second comparison for the presence of the predetermined second criterion and the outputting of the second signal are carried out before the cable is crimped with the contact sleeve;

acquiring the third image data of the contact sleeve and of the cable by the at least one third optical sensor;

carrying out, via the evaluation electronics, a third comparison of the third image data of the third optical sensor with third reference data;

checking the third comparison for the presence of a predetermined third criterion; and if the predetermined third criterion is satisfied, outputting a third signal, and wherein the acquiring of the third image data and the carrying out of the third comparison and the checking of the third comparison for the presence of the predetermined third criterion and the outputting of the third signal are carried out after the cable is crimped with the contact sleeve.

8. The method as claimed in claim 7, wherein longitudinal image data of at least one side view of the cable crimped with the contact sleeve is acquired by the at least one third optical sensor, and wherein the third image data is a single image and/or a video sequence.

9. The method as claimed in claim 7, wherein
the first optical sensor and/or the second optical sensor is provided by a first and/or second camera; and
the at least one third optical sensor is provided by at least one third camera and/or is provided by a laser scanner.

10. The method as claimed in claim 7, wherein:
the first and/or second and/or third signal initiates an idle state and/or standby mode and/or operating mode of the crimping machine; and/or
the first and/or second and/or third image data are displayed on a screen.

11. The method as claimed in claim 7, wherein:
the first and/or second and/or third signal comprises a first and/or second and/or third parameter; and/or
the programming of the evaluation electronics for the predetermined cable and the predetermined contact sleeve comprises a fourth and fifth parameter; wherein
the first and/or second and/or third and/or fourth and/or fifth parameter is taken into consideration by the evaluation electronics in a method for checking the quality of a crimp of the cable with the contact sleeve, making use of a sensor system for measuring a force and a displacement of a device for actuating and/or subjecting a crimping unit to compression and of the evaluation electronics; and
wherein a force/displacement curve is acquired during the crimping and displayed on a screen, and a conclusion as to the quality of the crimping is reached from the profile of the force/displacement curve.

12. A method for ensuring and/or checking the quality of a crimp making use of a crimping machine for crimping a cable with a contact sleeve and making use of a first optical sensor for detecting and/or recording first image data of the contact sleeve and making use of evaluation electronics, the method comprising:
selecting a predetermined cable and a predetermined contact sleeve for a predetermined crimping;
setting a predetermined suitable crimping height;
setting a predetermined suitable insulation stripping of the cable;
programming the evaluation electronics for the predetermined cable and the predetermined contact sleeve, wherein first reference data is selected by the evaluation electronics from a large number of predetermined first reference data;
acquiring the first image data of the contact sleeve by the first optical sensor;
carrying out, via the evaluation electronics, a first comparison of the first image data of the first optical sensor with the first reference data of a predetermined contact sleeve;
checking the first comparison for the presence of a predetermined first criterion; and
if the predetermined first criterion is satisfied, outputting a first signal,
wherein the acquiring of the first image data and the carrying out of the first comparison and the checking of the first comparison for the presence of the predetermined first criterion and the outputting of the first signal are carried out before the cable is crimped with the contact sleeve.

13. A crimping machine with a spiral conveyor for feeding a plurality of contact sleeves provided for crimping with a cable, wherein the spiral conveyor comprises a feed rail, by which the contact sleeves of the crimping machine are fed in a predetermined orientation, and wherein a first optical sensor is provided for acquiring first image data of a contact sleeve at the feed rail; and/or
a second optical sensor is provided for acquiring second image data of a cable, wherein
the crimping machine comprises an insulation-stripping device for stripping the insulation of the cable provided for crimping with the contact sleeve and an opening for manually feeding the cable for insulation stripping and subsequent crimping of the cable, wherein the second optical sensor is provided at the opening; and wherein
at least one third optical sensor is provided at the opening for acquiring image data of a cable crimped with a contact sleeve.

14. The crimping machine as claimed in claim 13, wherein the crimping machine comprises a crimping device, and wherein the crimping device is an indent crimping device.

* * * * *